United States Patent
Chiyouji et al.

(10) Patent No.: US 6,301,769 B1
(45) Date of Patent: Oct. 16, 2001

(54) METHOD FOR ASSEMBLING TWO ASSEMBLIES TOGETHER AND ROTATING MEDIUM CONNECTING THESE ASSEMBLIES

(75) Inventors: Masami Chiyouji; Yoshiaki Higashi; Norihisa Ikemura, all of Suzuka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,999

(22) Filed: Sep. 7, 1999

(30) Foreign Application Priority Data

Sep. 7, 1998 (JP) .................................................. 10-252077

(51) Int. Cl.[7] .................................................. B21D 39/00
(52) U.S. Cl. ............................................. 29/513; 403/306
(58) Field of Search ............................... 29/513; 403/306, 403/277, 274, 278, 335, 336, 337

(56) References Cited

U.S. PATENT DOCUMENTS

| | | | |
|---|---|---|---|
| 605,870 | * 6/1898 | Gubelmann | 29/509 |
| 1,656,856 | * 1/1928 | Gagnon | 29/512 |
| 3,106,759 | * 10/1963 | Kytta | 29/453 |
| 3,680,900 | * 8/1972 | Kawakami | 287/93 |
| 3,824,684 | * 7/1974 | Wheeler | 29/596 |
| 5,988,931 | * 11/1999 | Otwell | 403/299 |
| 6,036,452 | * 3/2000 | Huang | 417/360 |

* cited by examiner

Primary Examiner—Lynne H. Browne
Assistant Examiner—John B. Walsh
(74) Attorney, Agent, or Firm—Liniak, Berenato, Longacre & White

(57) ABSTRACT

In order to improve operation efficiency, there is provided a method for assembling two assemblies together through a rotating medium, in which all the processes are automated except for fitting engagement of the spline portions. The method comprises a first manual operational step and a second automatic operational step. The first manual operational step includes a process for connecting a first rotating shaft member of a first assembly and the rotating medium while adjusting phases thereof. The second step includes a process for fitting a plurality of split knock-pins provided on the rotating medium into corresponding fitting holes of a second rotating shaft member of a second assembly, and thereafter spreading the front end of each split knock-pin so as to fix the rotating medium to the second rotating shaft, and assembling the first assembly with the second assembly.

2 Claims, 5 Drawing Sheets

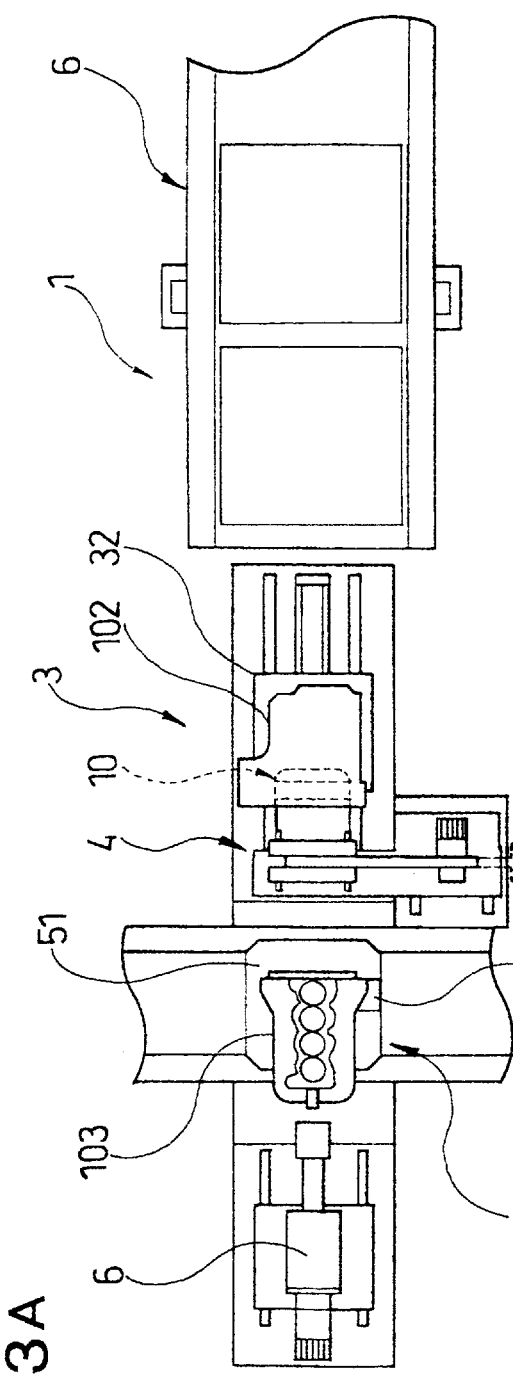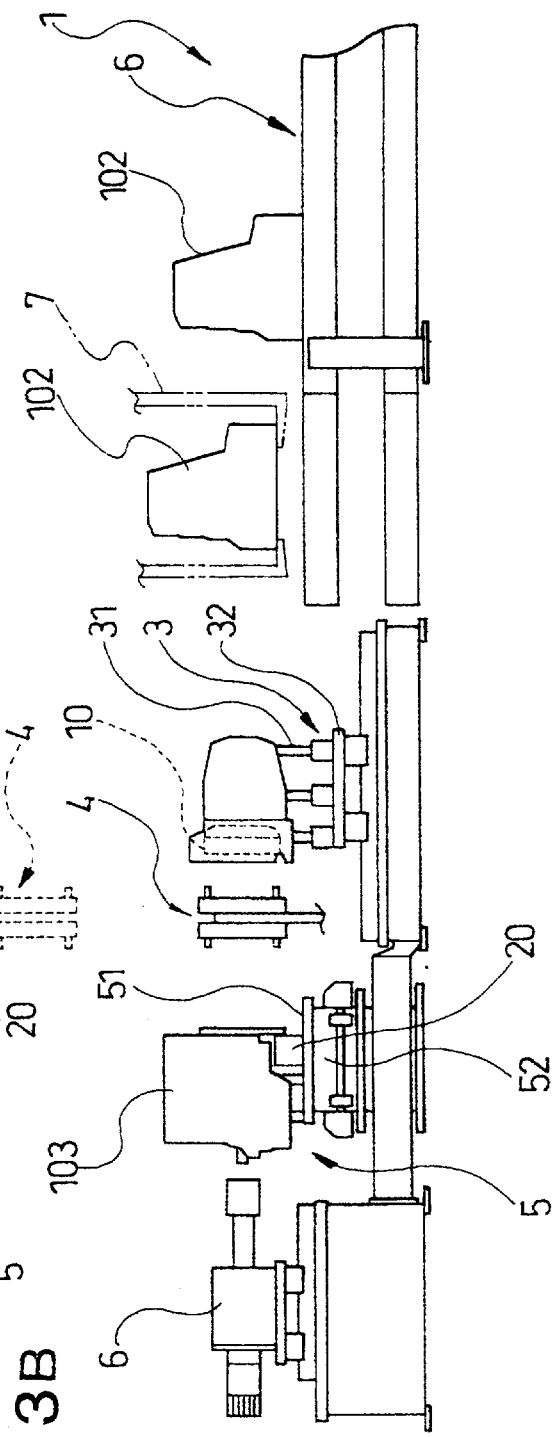

METHOD FOR ASSEMBLING TWO ASSEMBLIES TOGETHER AND ROTATING MEDIUM CONNECTING THESE ASSEMBLIES

BACKGROUND OF THE INVENTION

1. Field of the invention

The present invention relates to a method for assembling two assemblies together, each of which assembly has a rotating shaft member to be connected to the other rotating shaft member through a rotating medium. The present invention also relates to a rotating medium used for this method. More particularly, the present invention relates to a method for assembling, for example a cylinder block assembly of an automobile and a transmission assembly together through a rotating medium such as a torque converter.

2. Prior Art

In the process of automobile assembly, there is a need for assembling two assemblies together through a rotating medium, such as in the case of assembling a cylinder block assembly with a transmission assembly or assembling a clutch assembly. In such case, each assembly has a rotating shaft member to be connected to the other rotating shaft member through a rotating medium. Specifically, one of these assemblies is connected to the rotating medium by fitting engagement of the splines formed on the assembly and the rotating medium, respectively.

Well-known prior art method for assembling these two assemblies together will be described. By way of example, assembling a cylinder block assembly with a transmission assembly will be described with reference to FIG.5. FIG.5 is an enlarged vertical section partly showing a conventional torque converter, cylinder block assembly and a transmission assembly.

A torque converter 101 as a rotating medium is a device for the transmission of power through a fluid such as oil held in a casing. The torque converter 101 comprises a doughnut-shaped casing 101a filled with oil, a stator 101b, and two impellers 101c, 101d positioned opposite to each other around the stator 101b.

One of the two impellers 101c (hereinafter referred to as a pump impeller) is integrated with the casing 101a. When the engine is actuated, power is transmitted from the engine through a crankshaft 104, drive plate 105 and the casing 101a so as to make a flow of oil within the casing 101a. Such flow of oil is transmitted to the other impeller 101d (hereinafter referred to as a turbine runner) while it is controlled by the stator 101b. The turbine runner 101d is then rotated. The turbine runner 101d is further connected to a main shaft 102a of a transmission assembly 102 so that the main shaft 102a is rotated by the rotation of the turbine runner 101d. Accordingly, when the engine is actuated, rotation of the pump impeller 101c is transmitted through oil to the main shaft 102a, thereby rotating the main shaft 102a.

In such torque converter 101, since the pump impeller 101c, stator 101b and the turbine runner 101d are rotated independently, separate spline portions 106a, 106b, 106c are provided at the respective center portions thereof.

The transmission assembly 102 is provided with a first, second and a third spline portions 107a, 107b, 107c for fitting engagement with the corresponding spline portions 106a, 106b, 106c of the torque converter 101. The first spline portion 107a is formed at a position where the transmission assembly 102 is connected to the pump impeller 101c through a bearing 102b. The second spline portion 107b is formed at a position where the transmission assembly 102 is connected to the stator 106c around the main shaft 102a. And the third spline portion 107c is formed at the front side of the main shaft 102a so as to connect the main shaft 102a and the turbine runner 101d. Here, the main shaft 102a is the rotating shaft member of the transmission assembly 102.

Known method for assembling the transmission assembly 102 and the cylinder block assembly 103 together will be described. The cylinder block assembly 103 holds the crankshaft 104 at a journal portion (not shown). The drive plate 105 is then mounted at the end of the crankshaft 104. Here, the crankshaft 104 and the drive plate 105 form the rotating shaft member of the cylinder block assembly 103.

At first, the torque converter 101 is fixed to the drive plate 105 through a plurality of bolts 105a, 105a. To this end, a mounting bracket 101e of the torque converter 101 is provided with bolt holes 101f and the drive plate 105 is also provided with corresponding bolt holes 105d. When the torque converter 101 is fixed to the drive plate 105, a plurality of bolts 105a, 105a are inserted from the drive plate 105 and they are screwed between the drive plate 105 and the torque converter 101.

Secondly, the transmission assembly 102 is assembled with the cylinder block assembly 103 with the first, second and the third spline portions 107a, 107b, 107c of the transmission assembly 102 fittingly engaged with the corresponding spline portions 106a, 106b, 106c of the torque converter 101. When assembling, phase adjustment is carried out between each first, second or third spline portion 107a, 107b, 107c of the transmission assembly 102 and the corresponding spline portion 106a, 106b, 106c of the torque converter 101, and then the transmission assembly 102 and the cylinder block assembly 103 are assembled together by the fitting engagement of these spline portions. In such position, a mounting surface 102c provided at the circumferential end of the transmission assembly 102 abuts on an attachment surface 103a of the cylinder block assembly 103 so that the corresponding bolt holes 102d, 103b are met each other. A plurality of bolts 108, 108 (only one bolt 108 is shown in FIG. 5) are screwed within the bolt holes 102d, 103b, and the transmission assembly 102 and the cylinder block assembly 103 are assembled together.

SUMMARY OF THE INVENTION

In the aforementioned assembling process, two assemblies such as a cylinder block assembly 103 and a transmission assembly 102 are manually assembled. Such assembling process is not automated by the following reasons.

The rotating medium such as a torque converter 101 is mounted to one assembly (first assembly) such as a cylinder block assembly 103 through a plurality of bolts. Meanwhile, the rotating medium is also connected to the other assembly (second assembly) such as a transmission assembly 102 by the fitting engagement of the spline portions.

Since phase adjustment of the spline portions is difficult, the rotating medium should be connected to the second assembly by a manual operation. Especially when the second assembly is a transmission assembly 102, weight of the second assembly would be greater. Also, when the rotating medium is a torque converter 101, centering operation of the rotating medium would be difficult. For this reason, the process for connecting the rotating medium and the second assembly will not be automated.

Meanwhile, attachment of the rotating medium to the first assembly is carried out in advance of connecting the rotating medium and the second assembly. This is because the bolts should be screwed before the second assembly is connected to the rotating medium by the fitting engagement of the spline portions. In other words, the two assemblies should be assembled together while the second assembly is fittingly engaged with the rotating medium, which has been mounted to the first assembly. As a result, since the fitting engagement of the spline portions is not automated, the two assemblies should be assembled together by a manual operation.

In order to eliminate the above disadvantages, the present invention seeks to provide a method for assembling two assemblies through a rotating medium, in which all the operation is automated except for fitting engagement of the spline portions. The present invention also seeks to provide a rotating medium used for this method.

According to the present invention, there is provided a method for assembling a first assembly and a second assembly together, each of the first and the second assemblies having a first or a second rotating shaft member connected to the other second or first rotating shaft member through a rotating medium, and the first rotating shaft member being provided with splines for fitting engagement with the rotating medium, the method comprising a first manual operational step and a second automatic operational step: said first manual operational step including a process for connecting the first rotating shaft member and the rotating medium while adjusting phases thereof; and said second step including a process for fitting a plurality of split knock-pins provided on said rotating medium into corresponding fitting holes of said second rotating shaft member, and thereafter spreading the front end of each split knock-pin so as to fix the rotating medium to the second rotating shaft, and assembling said first assembly with said second assembly.

In such method, automation of the second step can be accomplished, allowing improved operation efficiency.

Preferably, the first assembly is a transmission assembly, the second assembly is a cylinder block assembly, and the rotating medium is a torque converter.

Another object of the present invention is to provide a rotating medium connecting a first rotating shaft member of a first assembly and a second rotating shaft member of a second assembly, the first rotating shaft member being provided with splines for fitting engagement with the rotating medium, characterized in that a plurality of split knock-pins are provided at positions corresponding to a plurality of fitting holes of said second rotating shaft member.

BRIEF DESCRIPTION OF THE DRAWINGS

FIG. 3 is a schematic view of an automatic assembling apparatus for automatically assembling a transmission assembly with a cylinder block assembly, in which FIG. 3A and FIG. 3B show a plan view and a side view, respectively.

DESCRIPTION OF THE PREFERRED EMBODIMENT

Figure 1:
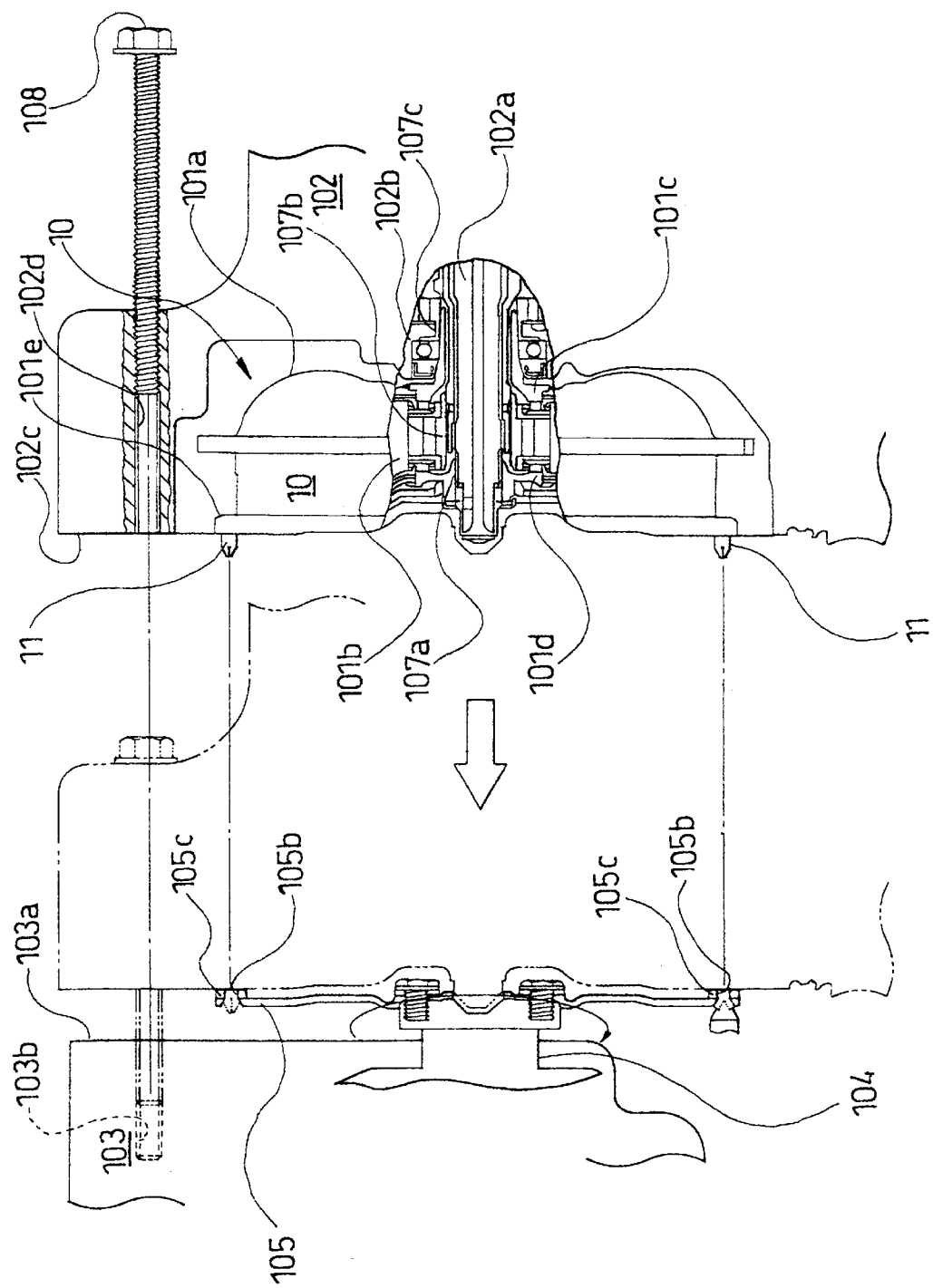
FIG. 1 is an enlarged exploded side view partly showing a torque converter, cylinder block assembly and a transmission assembly of the present invention.

Since the present invention is particularly preferable for assembling a transmission assembly and a cylinder block assembly together, a preferred embodiment will be described with regard to such assembling steps. Referring to FIG. 1, a plurality of split knock-pins 11, 11 are formed on a torque converter 10. Structure of the torque converter 10 according to the present invention and a process for mounting the torque converter 10 on the drive plate 105 will be described with reference to FIGS. 1 and 2. Parts or elements similar to those previously described regarding the conventional assemblies will be denoted by the same reference numerals and the description thereof will be omitted.

A mounting bracket 101e is formed on a casing 101a of the torque converter 10. The mounting bracket 101e is provided with a plurality of equidistant split knock-pins 11, 11 along the circumference of the casing 101a. A plurality of thickened plates 105c, 105c (hereinafter referred to as a mascara) are mounted to the circumference of the drive plate 105 with each plate 105c equally spaced apart from the adjacent plates. A through opening is formed at each mascara 10 in such a way that the opening extends through the mascara 105 and the drive plate 105. This through opening is a fitting hole 105b for inserting the corresponding split knock-pin 11. To this end, a plurality of fitting holes 105b, 105b are formed at corresponding positions to the split knock-pins 11, 11 on the torque converter 10.

Figure 2:
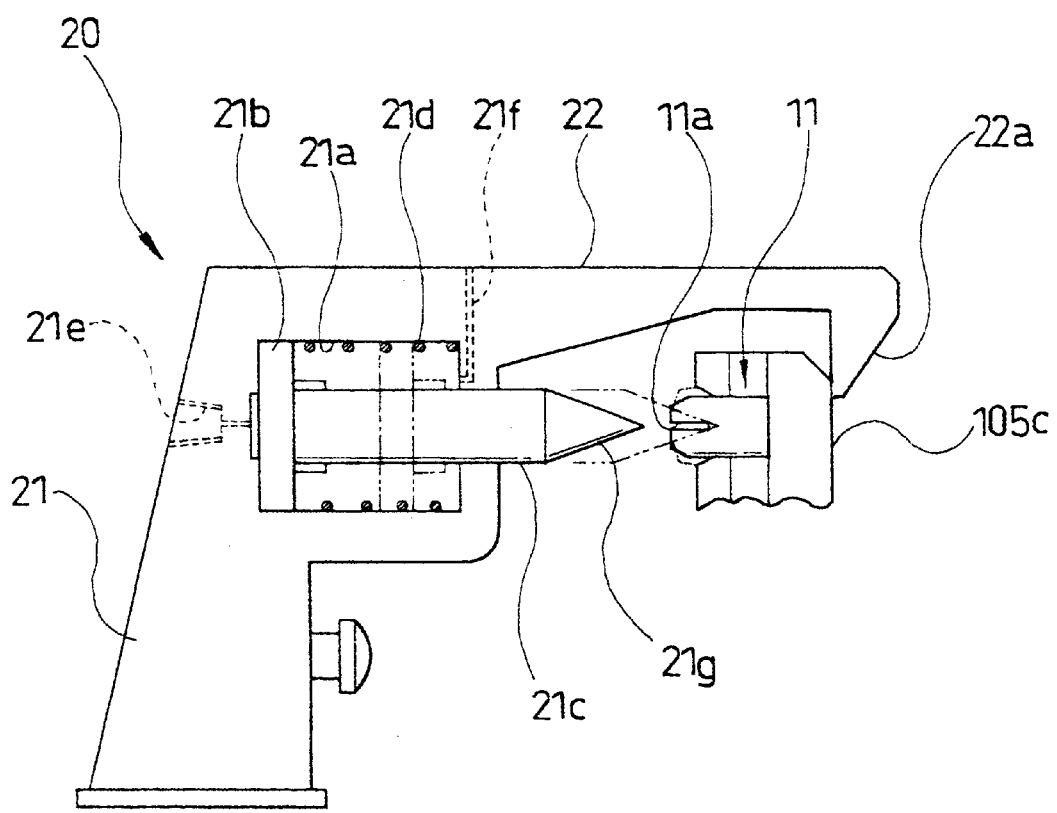
FIG. 2 is a side view of a mounting apparatus for spreading the front end of a split knock-pin on the torque converter so as to fix the torque converter to a drive plate.

As shown in FIG. 1, when the mounting bracket 101e of the torque converter 10 is superposed on the drive plate 105, the plurality of split knock-pins 11, 11 are inserted into the corresponding fitting holes 105b, 105b of the drive plate 105 (referring to dotted lines in FIG. 1). In such position of the torque converter 10, a mounting apparatus 20 is actuated. As shown in FIG. 2, the mounting apparatus 20 includes a main body 21, to which is mounted an engaging arm 22. The engaging arm 22 protrudes from the main body 21 and is provided at its front end with a nail 22a, which engages with the mascara 105c.

The main body 21 includes a cylinder chamber portion 21a, into which is slidably inserted a piston portion 21b. A coil spring 21d is positioned within the cylinder chamber portion 21a so as to urge the piston portion 21b in the direction away from the nail 22a. A crimping pin 21c is fixed at one end of the piston portion 21b and is moved by the sliding movement of the piston portion 21b. The front end of the piston portion 21b extends through the coil spring 21d and protrudes from the front wall of the cylinder chamber portion 21a.

Air passages 21e, 21f are connected to both front and rear sides of the cylinder chamber portion 21a so that air is supplied to and discharged from regions formed between the cylinder chamber portion 21a and the piston portion 21b. The air passage 21e is for supplying or discharging air, and the air passage 21f is for discharging air. When air is supplied from the air passage 21e to the region between the cylinder chamber portion 21a and the rear side of the piston portion 21b, the piston portion 21b is moved forward against the resilient force of the coil spring 21d. Meanwhile, air is discharged from the region between the cylinder chamber portion 21a and the front side of the piston portion 21b. When the piston portion 21b is moved forward, the crimping pin 21c fixed thereto is also moved forward so that the front end of the crimping pin 21c is inserted into a groove portion 11a formed at the front of the split knock-pin 11.

In this embodiment, the groove portion 11a is in the form of a cross, which divides the front of the split knock-pin 11 into four identical portions. When the front end of the crimping pin 21c is inserted into the grove portion 11a, the four portions are spread out by the front taper 21g of the crimping pin 21c. As a result, the torque converter 10 is fixed to the drive plate 105. Rotation of the drive plate 105 is therefore transmitted to the torque converter 10 and shear force works on the split knock-pins 11, 11.

In this embodiment, the fitting hole 105b is tapered so as to facilitate the spreading operation of the split knock-pin 11. The fitting hole 105b becomes larger toward the drive plate 105. Further, since the mascara 105c is mounted to the drive plate 105 around the fitting hole 105b, the fitting hole 105b is strengthened and centrifugal effect of the drive plate 105 is enhanced.

Method for assembling the transmission assembly 102 and the cylinder block assembly 103 together will now be described. The assembling process is carried out by the use of an automatic assembling apparatus 1 shown in FIG. 3. Therefore, the automatic assembling apparatus 1 will be described in relation to the assembling method. The assembling method includes a first manual operational step and a second automatic operational step.

FIG. 3A shows a plan view of the automatic assembling apparatus 1, and FIG. 3B shows a side view of the automatic assembling apparatus 1. Operation of the automatic assembling apparatus 1 is controlled by a non-shown control means.

As shown in FIGS. 3A and 3B, the automatic assembling apparatus 1 includes a transmission assembly locating unit 3, phase adjusting unit 4, cylinder block assembly locating unit 5, mounting apparatus 20 (referring to FIG. 2), and a fastening means (not shown).

The transmission assembly locating unit 3 comprises a transmission assembly positioning means 31 and a transferring means 32. A transmission assembly 102 is carried toward a transferring robot 7 by a conveyor 6. The transmission assembly 102 is then transferred to the transmission assembly positioning means 31 by the transferring robot 7. A torque converter 10 is manually assembled with the transmission assembly 102, while the transmission assembly positioning means 31 holds the transmission assembly 102 at a certain position. Meanwhile, the cylinder block assembly locating unit 5 comprises a cylinder block assembly positioning means 51 and a transferring means 52. The cylinder block assembly positioning means 51 holds a cylinder block assembly 103 at a certain position.

Figure 4:
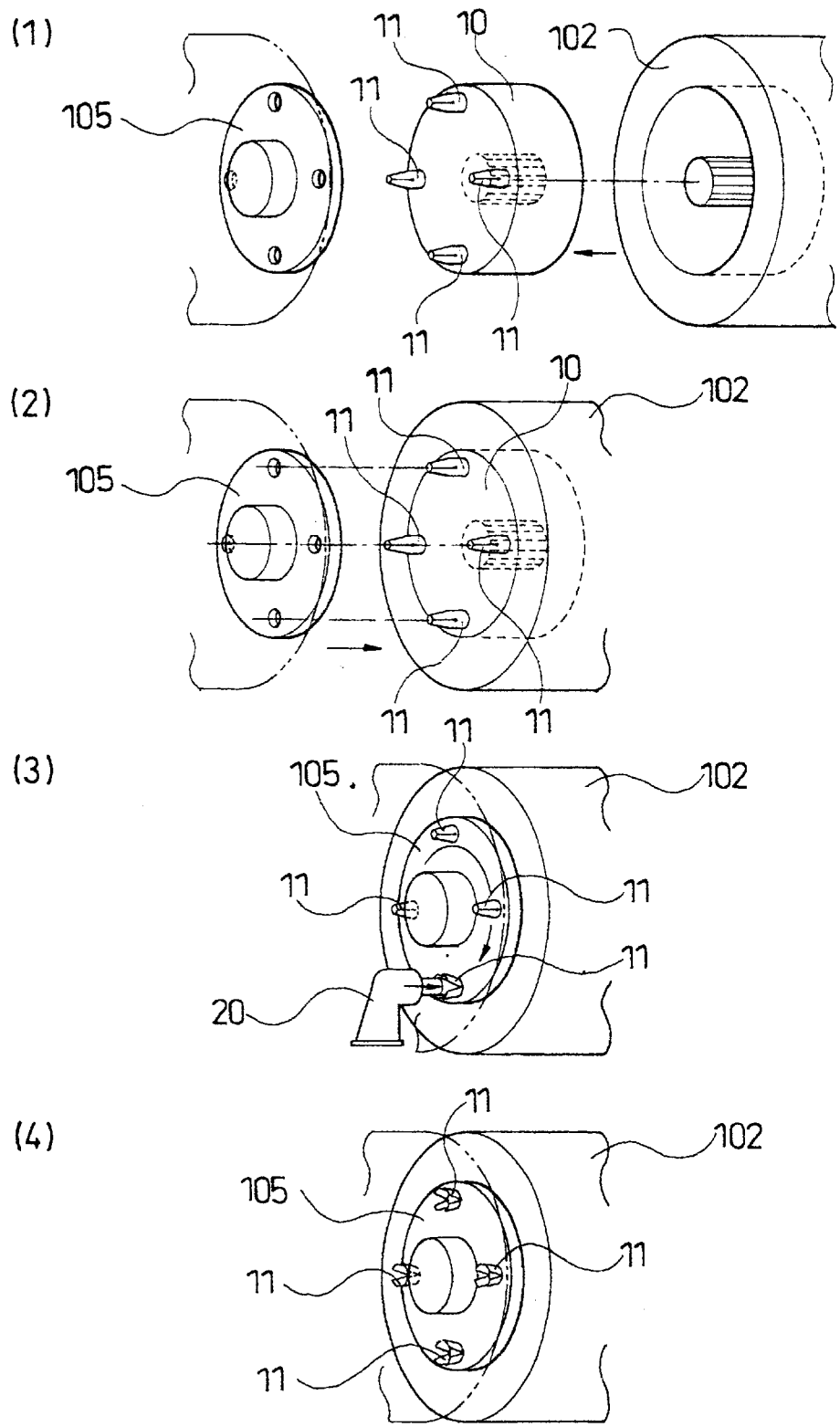
FIG. 4 is a perspective view explaining the assembling steps of the torque converter, cylinder block assembly and the transmission assembly.
Figure 5:
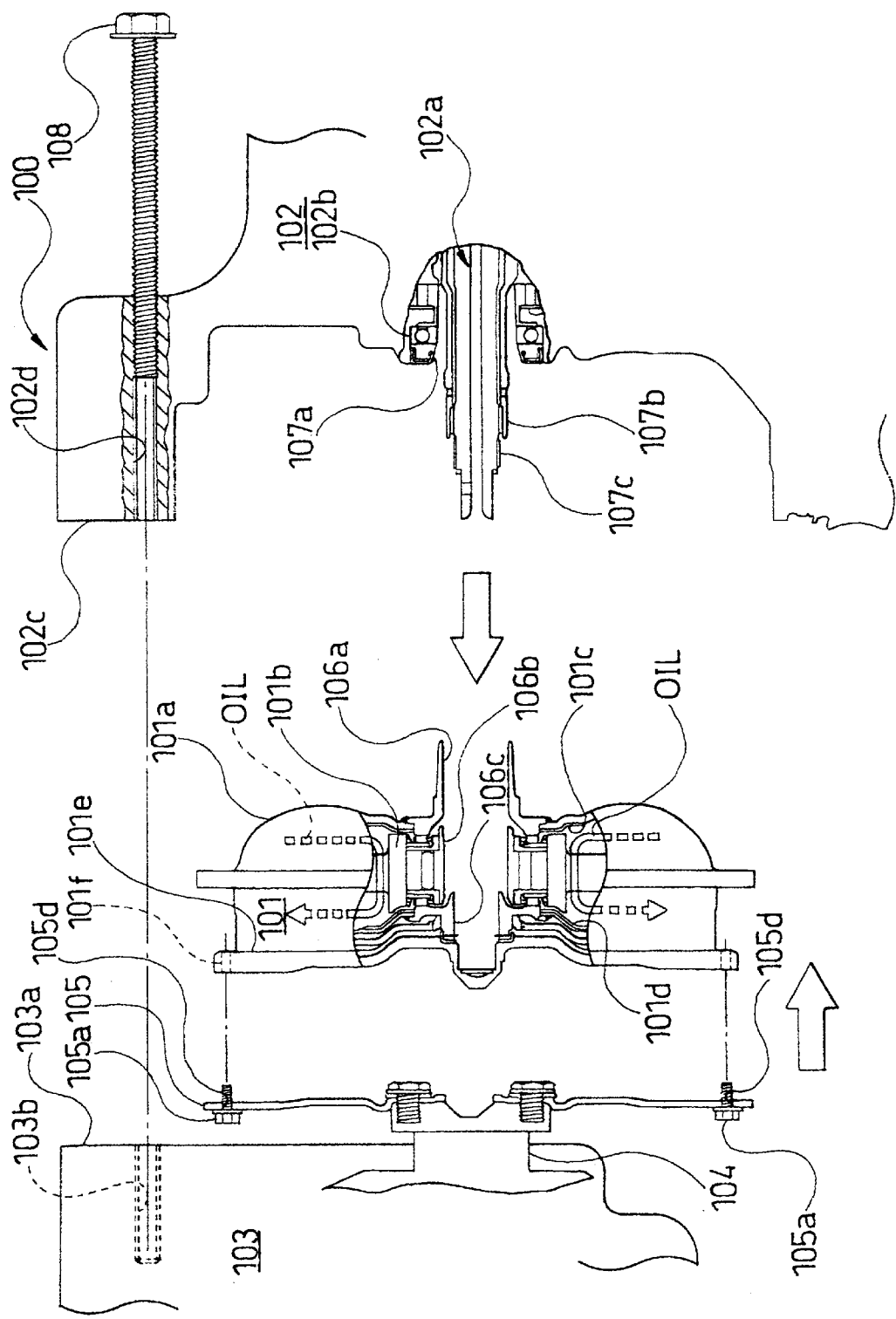
FIG. 5 is an enlarged vertical section partly showing a conventional torque converter, cylinder block assembly and a transmission assembly.

The abovementioned process corresponds to the first manual operational step. In this embodiment, phase adjustment between spline portions 106a, 106b, 106c of the torque converter 10 and the corresponding spline portions 107a, 107b, 107c of the transmission assembly 102 is also carried out during the first manual operational step. The first manual operational step is shown in (1) of FIG. 4.

In the following second step, the cylinder block assembly 103 is automatically assembled with the transmission assembly 102. When the above first manual operational step is completed, the transferring means 32 of the transmission assembly locating unit 3 is actuated so that the transmission assembly 102 with the torque converter 101 is moved close to the phase-adjustment position, where phase adjustment is carried out between the torque converter 10 and the drive plate 105 of the cylinder block assembly 103. The phase adjusting unit 4 is located in the phase-adjustment position. When the transmission assembly 102 with the torque converter 101 is moved close to the phase-adjustment position, the phase adjusting unit 4 moves from the stand by position (dotted line in FIG. 3) to the phase-adjustment position (solid line in FIG. 3) so as to carry out the phase adjustment between the torque converter 10 and the drive plate 105, that is alignment between the split knock-pins 11, 11 and the fitting holes 105b, 105b. This second automatic operational step is shown in (2) of FIG. 4.

When the phase adjustment is completed, the transmission assembly 102 and the cylinder block assembly 103 are moved closer to each other by the transferring means 32 such that the split knock-pins 11, 11 are fitted into the corresponding fitting holes 105b, 105b of the drive plate 105. In such position of the split knock-pins 11, 11, the mounting apparatus 20 shown in FIG. 2 actuates. The drive plate 105 is rotated at a certain time intervals such that the mounting apparatus 20 assembles the torque converter 10 and the drive plate 105 together. This assembling process is shown in (3) of FIG. 4, and the resulting assembly is shown in (4) of FIG. 4.

During or after this assembling process, the transmission assembly 102 and the cylinder block assembly 103 are fixed together by a plurality of bolts 105, 105 (FIG. 1). This is carried out by the fastening means (not shown).

When the cylinder block assembly 103 is fully assembled with the transmission assembly 102, the transferring means 52 of the cylinder block assembly locating unit 5 is actuated and transfers the resulting assembly made by the cylinder block assembly 103 and the transmission assembly 102 to the next operational step. Reference numeral 6 in FIG. 3 is a crank rotating unit, which is used for the aforementioned phase adjustment and the like. The crank rotating unit 3 rotates the crankshaft 104.

According to the present invention, even if two assemblies are connected at its respective rotational shaft members through a rotating medium and one of the rotating shaft members is assembled with the rotating medium by fitting engagement of the splines formed thereon, all the processes are automated except for fitting engagement of the spline portions, thereby allowing improved operation efficiency.

Further, when the rotating medium is attached to the rotating shaft member, fastening of bolts and examination of torque may be omitted. This leads to decreased number of the operational processes.

Moreover, since the number of the parts to be used is reduced, less production cost will be achieved.

Although the present invention has been described in its preferred embodiment with regard to assembling a transmission assembly 102 and a cylinder block assembly 103, it should be understood that the present invention is not limited to the specific embodiment. For example, the present invention may be applicable to assembling a clutch assembly, automatic assembling of a clutch assembly in the type of a flexible flywheel.

What is claimed is:

1. A method for assembling a first assembly and a second assembly together, each of the first and the second assemblies having a first or a second rotating shaft member connected to the other second or first rotating shaft member through a rotating medium, and the first rotating shaft member being provided with splines for fitting engagement with the rotating medium, the method comprising a first manual operational step and a second automatic operational step:

said first manual operational step including a process for connecting the first rotating shaft member and the rotating medium while adjusting phases thereof; and
said second step including a process for fitting a plurality of split knock-pins provided on said rotating medium into corresponding fitting holes of said second rotating shaft member, and thereafter spreading the front end of each split knock-pin so as to fix the rotating medium to the second rotating shaft, and assembling said first assembly with said second assembly.

2. A method for assembling a first assembly with a second assembly according to claim 1, wherein said first assembly is a transmission assembly, said second assembly is a cylinder block assembly, and said rotating medium is a torque converter.

* * * * *